(12) United States Patent
Dagley et al.

(10) Patent No.: US 8,270,798 B2
(45) Date of Patent: Sep. 18, 2012

(54) ROUTING GUIDE FOR A MOVABLE FIBER OPTIC EQUIPMENT TRAY OR MODULE

(75) Inventors: Mark R. Dagley, Fort Worth, TX (US); David L. Dean, Jr., Hickory, NC (US); Daniel S. McGranahan, Fort Worth, TX (US); Brian K. Rhoney, Hickory, NC (US); Kevin L. Strause, Keller, TX (US)

(73) Assignee: Corning Cable Systems LLC, Hickory, NC (US)

( * ) Notice: Subject to any disclaimer, the term of this patent is extended or adjusted under 35 U.S.C. 154(b) by 310 days.

(21) Appl. No.: 12/715,042

(22) Filed: Mar. 1, 2010

(65) Prior Publication Data

US 2010/0220968 A1 Sep. 2, 2010

Related U.S. Application Data

(60) Provisional application No. 61/156,238, filed on Feb. 27, 2009.

(51) Int. Cl.
*G02B 6/00* (2006.01)
(52) U.S. Cl. ........................................ 385/135; 385/134
(58) Field of Classification Search ........................ None
See application file for complete search history.

(56) References Cited

U.S. PATENT DOCUMENTS

| | | | | |
|---|---|---|---|---|
| 6,250,816 | B1 * | 6/2001 | Johnston et al. | 385/53 |
| 6,944,389 | B2 * | 9/2005 | Giraud et al. | 385/135 |
| 7,070,459 | B2 * | 7/2006 | Denovich et al. | 439/719 |
| 7,102,884 | B2 * | 9/2006 | Mertesdorf et al. | 361/679.4 |
| 7,509,016 | B2 * | 3/2009 | Smith et al. | 385/135 |
| 7,526,171 | B2 * | 4/2009 | Caveney et al. | 385/135 |
| 7,570,860 | B2 * | 8/2009 | Smrha et al. | 385/135 |
| 7,570,861 | B2 * | 8/2009 | Smrha et al. | 385/135 |
| 7,813,612 | B2 * | 10/2010 | Smith et al. | 385/135 |
| 7,873,253 | B2 * | 1/2011 | Smrha et al. | 385/135 |
| 7,945,135 | B2 * | 5/2011 | Cooke et al. | 385/135 |
| 7,974,509 | B2 * | 7/2011 | Smith et al. | 385/135 |
| 2005/0111809 | A1 * | 5/2005 | Giraud et al. | 385/135 |
| 2006/0018622 | A1 * | 1/2006 | Caveney et al. | 385/135 |
| 2008/0219632 | A1 * | 9/2008 | Smith et al. | 385/135 |
| 2009/0238532 | A1 * | 9/2009 | Smith et al. | 385/135 |
| 2010/0054685 | A1 * | 3/2010 | Cooke et al. | 385/135 |
| 2010/0111482 | A1 * | 5/2010 | Smrha et al. | 385/135 |
| 2011/0097053 | A1 * | 4/2011 | Smith et al. | 385/135 |
| 2011/0211801 | A1 * | 9/2011 | McGranahan et al. | 385/136 |

* cited by examiner

*Primary Examiner* — Rhonda Peace
(74) *Attorney, Agent, or Firm* — John H. Vynalek

(57) ABSTRACT

A cable routing guide attached to a fiber optic apparatus, such as a module positioned on a fiber optic equipment tray is disclosed. The cable routing guide is adapted to receive a length of at least one fiber optic cable intended to be connected to a cable connection point, such as a fiber optic adapter disposed on the module. The cable routing guide allows the at least one fiber optic cable to move in response to the fiber optic equipment tray or the module moving between a first position and a second position in a manner such that the length of the at least one fiber optic cable from the cable routing guide to the fiber optic adapter remains substantially unchanged. Moreover, the at least one fiber optic cable that is received by the cable routing guide may be retained and maintained by the cable routing guide without being tensed or stressed. In this manner, the at least one fiber optic cable that is routed to and through the fiber optic apparatus may not be affected by the movement of the module frame, the module, and/or the adapter between the first and second positions.

18 Claims, 6 Drawing Sheets

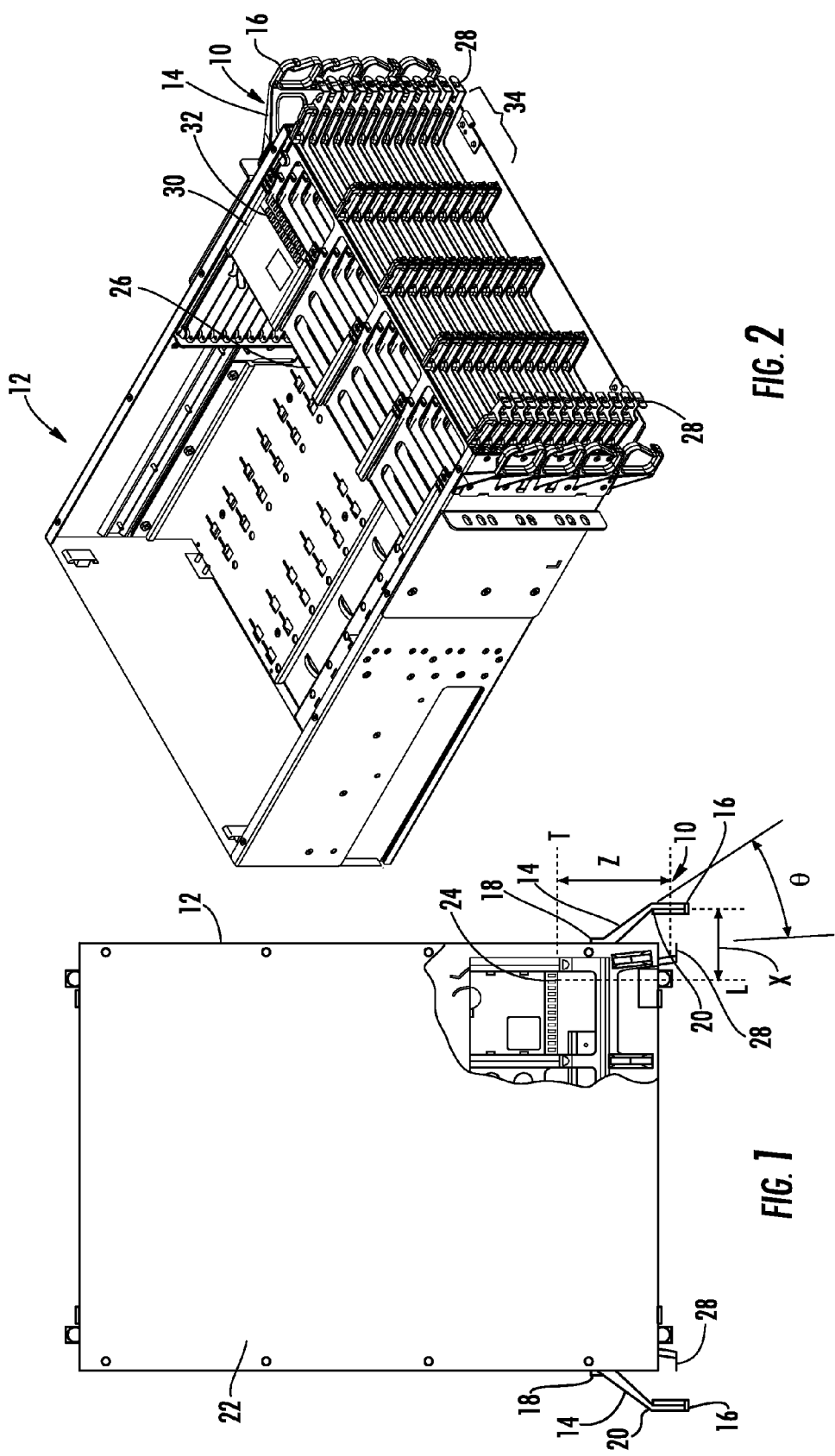

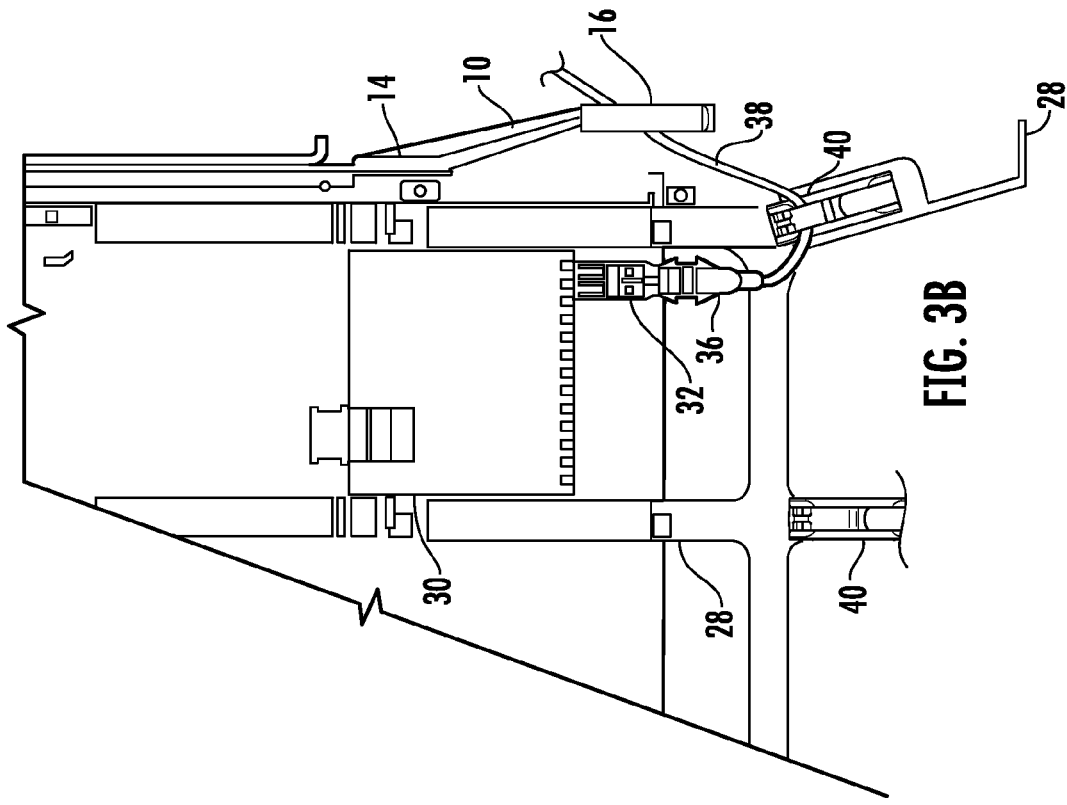
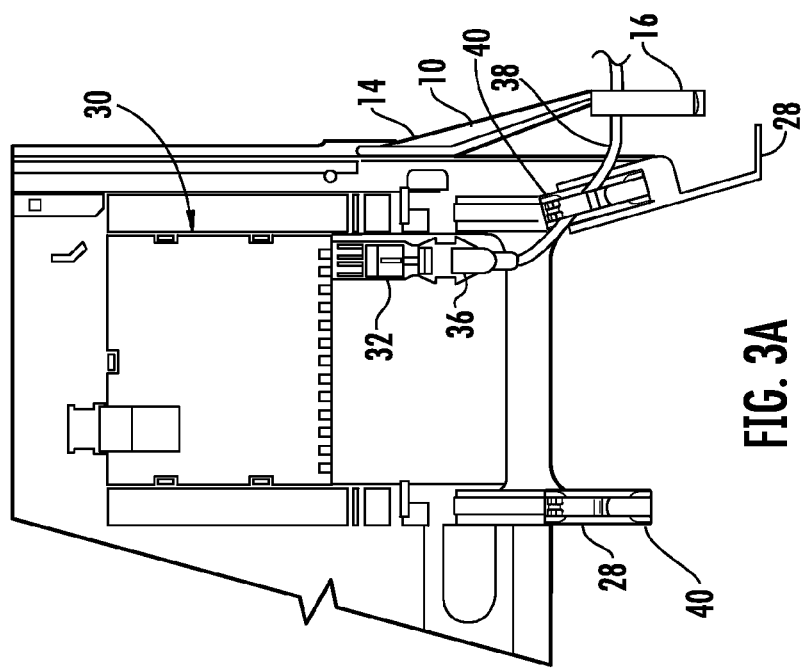

ROUTING GUIDE FOR A MOVABLE FIBER OPTIC EQUIPMENT TRAY OR MODULE

This application claims benefit of priority to U.S. provisional Application No. 61/156,238 filed on Feb. 27, 2009, the contents of which are relied upon and incorporated by reference in its entirety.

BACKGROUND

1. Field of the Disclosure

The technology of the disclosure relates to a fiber optic apparatus, and more particularly to a fiber optic apparatus having a routing guide adapted for use with a movable fiber optic equipment tray or module to provide for improved cable management.

2. Technical Background

Benefits of optical fiber use include extremely wide bandwidth and low noise operation. Because of these advantages, optical fiber is increasingly being used for a variety of applications, including but not limited to broadband voice, video, and data transmission. Fiber optic networks employing optical fiber are being developed and used to deliver voice, video, and data transmissions to subscribers over both private and public networks. These fiber optic networks often include separated connection points at which it is necessary to link optical fibers in order to provide "live fiber" from one connection point to another connection point. In this regard, fiber optic equipment is located in data centers or central offices to support such interconnections.

The fiber optic equipment is typically included in housings that are mounted in equipment racks to maximize the use of space. The fiber optic equipment may have a cable connector point for making cable-to-cable fiber optic connections. Examples of such fiber optic equipment are patch panels and fiber optic modules, to name just two. Both the patch panel and the fiber optic module are designed to provide the cable-to-cable fiber optic connections through a fiber optic adapter, which also allows for the management of the polarity of fiber optic cable connections. The patch panel and the fiber optic module are typically mounted to a chassis which is then mounted inside an equipment rack or housing. The chassis may be provided in the form of a tray that is extendable from and retractable toward the equipment rack like a drawer. Thus, the patch panel and/or the fiber optic module may also be extendable from and retractable toward the equipment rack. Thus, extending the patch panel and/or fiber optic module allows a technician access to fiber optic adapters disposed on the patch panel or in the fiber optic module. In this manner, the technician may access any fiber optic cables connected to the fiber optic adapters without removing the fiber optic module from the equipment rack. However, as the tray, and therefore the patch panel and/or fiber optic module, extend and retract, the fiber optic cables routed to the equipment rack and to the fiber optic module may tend to be pulled and displaced. Such pulling and displacing of the fiber optic cables may result in the fiber optic cables becoming disorganized, misaligned and possibly tangled. Additionally, in such case the fiber optic cables may become tensed or stressed.

SUMMARY

Embodiments disclosed in the detailed description include a cable routing guide having an arm and a guide piece. The arm is adapted to be attached to a structure having at least one cable connection point movable with respect to the structure between a first and second position. The guide piece attaches to the arm. The guide piece may be stationary or may be movable with respect to the cable connection point. The guide piece is adapted to receive a length of at least one cable intended to be connected to the at least one cable connector port. The guide piece is oriented to the structure such that the guide piece allows the fiber optic cable to move in response to the cable connection point moving between the first position and the second position in a manner that the length of the fiber optic cable from the guide piece to the adapter remains substantially unchanged.

The cable routing guide is attached to the structure such that the guide piece is displaced from the longitudinal and transverse axes of the cable connector port certain distances when the cable connector point is in the first position. Also, the guide piece is angularly displaced from the longitudinal axis. In this manner, the guide piece may be positioned in a location between a first and a second position of the cable connection point.

The embodiments disclosed in the detailed description also include a fiber optic apparatus having a fiber optic equipment tray having at least one module movably positioned on the fiber optic equipment tray. The fiber optic equipment tray and the module move between a first and a second position. At least one adapter is disposed on the module. The adapter is configured to receive a connectorized end of a fiber optic cable. The fiber optic apparatus also includes a cable routing guide. The cable routing guide may be stationary or may be movable with respect to the module and is adapted to receive a length of at least one fiber optic cable intended to be connected to the at least one adapter. The cable routing guide allows the fiber optic cable to move in response to the module moving between the first position and the second position in a manner that the length of the fiber optic cable from the cable routing guide to the adapter remains substantially unchanged.

The embodiments disclosed in the detailed description also include a cable routing guide attached to a fiber optic apparatus, such as a module positioned on a fiber optic equipment tray. The cable routing guide is adapted to receive a length of at least one fiber optic cable intended to be connected to a cable connector point, such as a fiber optic adapter, disposed on the module. The cable routing guide allows the fiber optic cable to move in response to the module moving between a first position and a second position in a manner such that the length of the at least one fiber optic cable from the cable routing guide to the adapter remains unchanged. Moreover, the at least one fiber optic cable that is received by the cable routing guide may be retained and maintained by the cable routing guide without being substantially tensed or stressed. In this manner, the fiber optic cable that is routed to and through the fiber optic apparatus to the cable routing guide may not be substantially affected by the movement of the module and/or the adapter between the first and second positions. In another aspect, there is provided a cable routing guide. The cable routing guide has an arm adapted for attaching the cable routing guide to a structure. A guide piece attaches to the arm. The guide piece comprises sides formed into a passage. The passage is adapted to receive a length of at least one cable. The cable routing guide also includes a retainer configured to maintain the cable within the passage.

Additional features and advantages will be set forth in the detailed description which follows, and in part will be readily apparent to those skilled in the art from that description or recognized by practicing the embodiments described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments and together with the description serve to explain the principles and operation of the concepts disclosed.

BRIEF DESCRIPTION OF THE FIGURES

FIG. 1 is a top plan view of a cable routing guide attached to a structure, according to an embodiment;

FIG. 2 is a front perspective view of cable routing guides attached to a fiber optic apparatus comprising fiber optic equipment trays, according to an embodiment;

FIG. 3A is a top plan view of a module with an adapter in a fiber optic equipment tray retracted towards the fiber optic equipment tray, according to an embodiment;

FIG. 3B is a top plan view of the module with an adapter of FIG. 3A extended with the fiber optic equipment tray, according to an embodiment;

DETAILED DESCRIPTION

Figure 4:
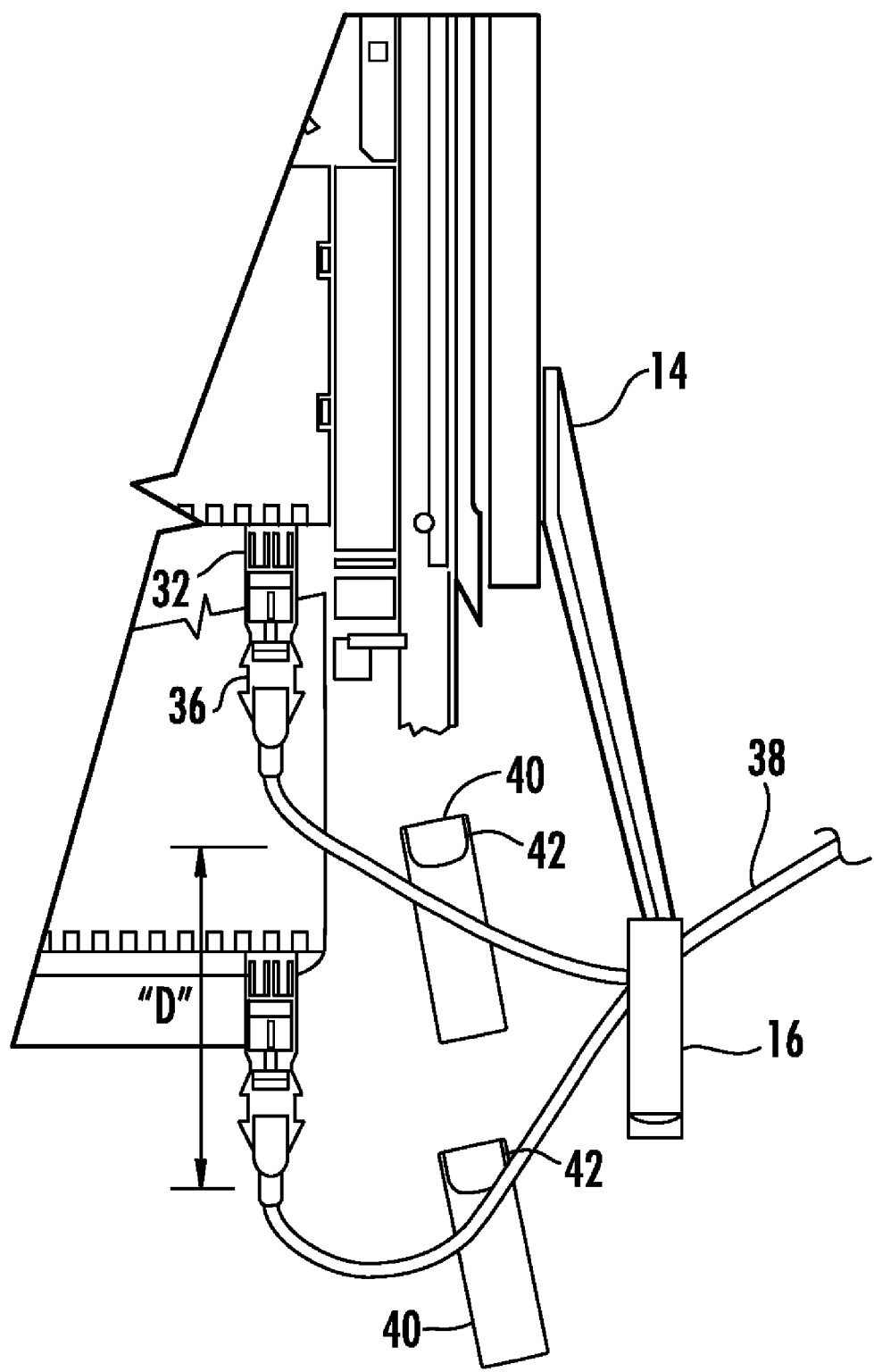
FIG. 4 is a top plan view of the movement of a module with an adapter and a fiber optic cable between a first and second position.

Reference will now be made in detail to the preferred embodiments, examples of which are illustrated in the accompanying drawings, in which some, but not all embodiments are shown. Indeed, the concepts may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

To maximize the use of space in the data center, it is desirable to mount as many modules as possible in a tray and/or a drawer in each equipment rack. Additionally, it is desirable to dispose as many adapters as possible in each such module. In other words, it is desirable to increase the density of adapters disposed within a data center. Because fiber optic cables connecting to the adapters typically have multiple optical fibers, the increased density of adapters results in the increased density of the fiber optical cables. As a result, the number and length of fiber optic cables required to interconnect the adapters also increase.

The fiber optic cables may be trunk cables routed between components or equipment mounted in different equipment racks, or jumper cables routed between components or equipment routed within an equipment rack. Typically, trunk cables may be routed to and enter from the back of an equipment rack, while jumper cables are routed to the front of the equipment rack. In either case, the fiber optic cables must be effectively managed and organized, particularly in view of high density installations. Further, the management and organization must be maintained as the trays and/or modules are retracted or extended.

FIG. 1 illustrates an exemplary cable routing guide 10 for managing and organizing cables. In FIG. 1, two cable routing guides 10 are shown in a top plan view, each mounted to one of two sides of a structure 12. The structure 12 may be any type of structure that houses or supports components that receive and/or connect cables. The cables may be any type of cables, including without limitation, electrical and fiber optic cables. The fiber optic cable may include one or more optical fibers. The terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive optical fiber is ClearCurve® Multimode fiber commercially available from Corning Incorporated.

The cable routing guide 10 has an arm 14 and a guide piece 16. The arm has a first end 18 and a second end 20. The cable routing guide 10 attaches to the structure 12 at the first end 18 of the arm 14. The guide piece 16 attaches to the second end 20 of the arm 14. In this manner, the cable routing guide 10 attaches to the structure 12. The structure 12 has a cover 22, a portion of which is shown cut-away to expose a cable connection point 24 therein. The cable connection point 24 may be any type of component, hardware, module, panel, or adapter at which a cable is connected. In the embodiment shown in FIG. 1, the connection point 24 is an adapter in or on a module. The cable routing guide 10, measured from the connection point 24 to the guide piece 16, is displaced a certain distance "X" from the longitudinal axis "L" of the structure 12 through the cable connection point 24, and a certain distance "Z" from the transverse axis "T" of the structure 12 through the cable connection point 24. Further, the cable routing guide 10 is oriented such that it is angularly displaced by "θ" degrees from the longitudinal axis "L". In this manner, the guide piece 16 may be located between the first and second positions of the cable connection point 24. The angle θ may be between about 0-90 degrees. As an example, a module may be positioned in the structure 12 such that the module is not adjacent to the side of the structure 12. In such a case, the arm 14 of cable routing guide 10 may extend forwardly from and in the same plane of the side of the structure 12.

Referring now to FIG. 2, there are shown cable routing guides 10 attached to a structure 12 in the form of a fiber optic apparatus, for example a shelf, or a chassis. In FIG. 2, the structure 12 is shown as a 4U chassis for mounting in a fiber optic equipment rack. The designation "U" refers to the standard fiber optic equipment rack size equal to 1.75 inches in height. In certain applications, the width may be, without limitation, nineteen (19), twenty-three (23), twenty-four (24), or thirty (30) inches. The structure 12 may be any size or type. As additional examples, the structure may be a 1U, 2U or 3U chassis. In this embodiment, the fiber optic apparatus comprises a plurality of fiber optic equipment trays 26. In FIG. 2, twelve fiber optic equipment trays 26 in a stacked arrangement are shown. Each fiber optic equipment tray 26 has four module sections 34. However, the structure 12 may comprise any number of fiber optic equipment trays 26, each having any number of module sections 34. In FIG. 2, one module 30 having fiber optic adapters 32 is shown positioned in the top fiber optic equipment tray 26 in one of the module sections 34. Each fiber optic equipment tray 26 may have more than one module 30 with each module positioned in a respective module section 34. Thus, although one module 30 is shown positioned in only one of the module sections 34, it is understood that modules 30 may be positioned in all or any number of module sections 34.

The fiber optic equipment tray 26 and the modules 30 positioned thereon are movable with respect to the structure 12. The fiber optic equipment tray 26 may be retracted toward the structure 12 to position within the structure 12, or partially or fully extended from the structure 12. In this manner, by being positioned on the fiber optic equipment tray 26, the modules 30 are movably mounted to the structure 12. Thus, each fiber optic equipment tray 26 and the modules 30 mounted on that fiber optic equipment tray 26 may be moved between a first position and a second position. Each fiber optic equipment tray 26 has one or more pull tabs 28, which may be used to extend and/or retract the fiber optic equipment tray 26. Additionally, individual modules 30 may be removed from the fiber optic equipment tray 26 by the sliding the module 30 forward. While in this embodiment the movement of the fiber optic equipment trays 26 and the modules 30 is a sliding movement employing rails and guides, any other type of system or mechanism may be used to provide for movability between a first and second position.

FIGS. 3A and 3B illustrate the fiber optic equipment tray 26 on which a module 30 with an adapter 32 is positioned. The fiber optic equipment tray 26, the module 30 and the adapter 32 retract and extend. The adapter 32 may be configured to receive a connector 36 attached to the end of a fiber optic cable 38. The fiber optic cable 38 may include one or more optical fibers. The connector 36 may be any type of fiber optic connector, for example, and without limitation, LC, SC, ST, LCAPC, SCAPC, MTRJ, and FC fiber optic connection types available. A cable routing guide 10 may receive a length of fiber optic cable 38 at the guide piece 16. The length of the fiber optic cable 38 extends through the guide piece 16, and routes to the adapter 32 on the module 30 via a jumper guide 40. The jumper guide 40 attaches to the fiber optic equipment tray 26, and, therefore, also may be retracted toward and extended from the structure 12. The jumper guide 40 is adapted to organize and align the length of the fiber optic cable 38 when the module 30 and the adapter 32 are retracted and extended.

The cable routing guide 10 being displaced from the connection point 24 along the "L" axis and the "T" axis, positions the guide piece 16 in a manner to be within the travel distance of the fiber optic equipment tray 26 between the first and second position, or between the fiber optic tray's 26 retracted position and extended position. Because of this positioning, the length of the fiber optic cable 38 from the cable routing guide 10 to the adapter 32 does not essentially change as the fiber optic equipment tray 26 and, therefore, the module 30 and the adapter 32 are retracted and/or extended. Moreover, the fiber optic cable 38 that is received by the cable routing guide 10 may be retained and maintained by the cable routing guide 10 without being substantially tensed or stressed. In this manner, the fiber optic cable 38 that is routed to and through the structure 12 may not be affected by the movement of the module 30 and the adapter 32 between the first and second position.

The movement of the fiber optic equipment tray 26 and the module 30 with the adapter 32 can be seen with additional detail in FIG. 4. FIG. 4 illustrates the fiber optic equipment tray 26 in both the retracted and extended positions. In FIG. 4, the top of the jumper guide 40 is not shown so that guide post 42 in the jumper guide 40 may be seen. The fiber optic cable 38 routes from the guide piece 16 of the cable routing guide 10 through the jumper guide 40 and may come in contact with the guide post 42. The fiber optic cable 38 then continues to the adapter 32. When the fiber optic equipment tray 26 moves, the jumper guide 40 also moves. As the jumper guide 40 moves the guide post 42 moves. The guide post 42 contacts the fiber optic cable 38 and the fiber optic cable 38 moves in response to the movement of the guide post 42 as the fiber optic equipment tray 26 moves. The guide post 42 moves a distance "D" as the fiber optic equipment tray 26 moves between the first and second positions, i.e., extended and refracted. The cable routing guide 10 is positioned to align between the first position and the second position of the fiber optic equipment tray 26. In other words, the cable routing guide 10 is positioned within the range of the distance "D". In this embodiment, the distance "D" may be about 3½ inches. Although "D" may be any distance. Due to the positioning of the cable routing guide 10 with respect to the movement of the fiber optic equipment tray 26, and thereby the guide post 42, the fiber optic cable 38 moves, but the length of the fiber optic cable 38 from the guide piece 16 to the adapter 32 does not substantially change. As discussed above, the cable routing guide 10 may be positioned at a distance "X" from the longitudinal axis "L" and a distance "Z" from the transverse axis "T." In this embodiment, the distance "X" may be about 2¾ inches, while the distance "Z" may be about 4½ inches. It should be understood, though, that "X" and "Z" may be any distance such that the length of the fiber optic cable 38 does not substantially change when the fiber optic equipment tray 26 moves between the first position and the second position based on the distance "D."

Figure 5A:
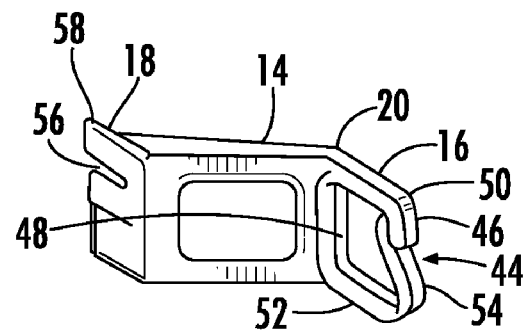
FIGS. 5A and 5B are perspective views of a 1U and 4U cable routing guide, respectively, according to exemplary embodiments.
Figure 5B:
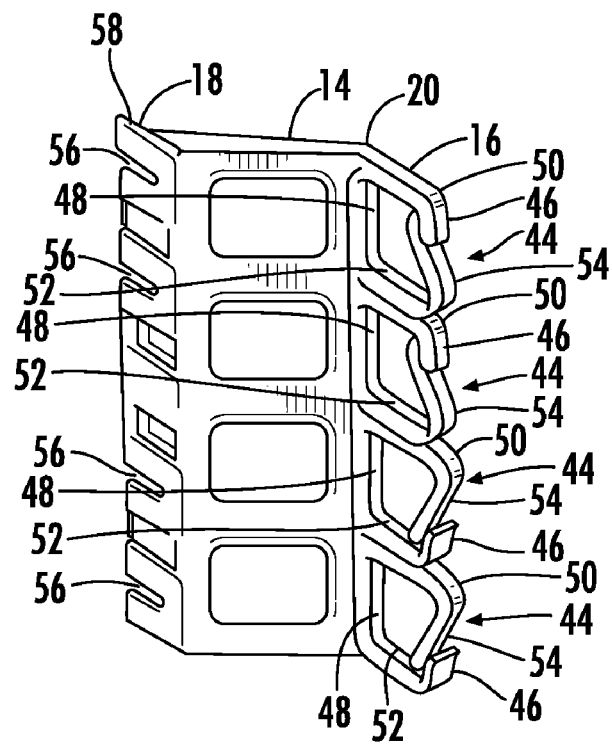

FIGS. 5A and 5B illustrate perspective views of two cable routing guides 10. FIG. 5A shows the cable routing guide 10 for a 1U structure 12, and FIG. 5B shows the cable routing guide 10 for a 4U structure 12. The guide piece 16 has one or more retainers 44. The guide piece in FIG. 5A has one retainer 44, while the guide piece in FIG. 5B has four retainers 44. The retainer 44 has a front 46, a back 48, a top 50, a bottom 52, and a retainer clip 54 which form a passage through which fiber optic cables 38 (not shown in FIGS. 5A and 5B) may be routed. The retainer clip 54 positions behind and against the front 46. The retainer clip 54 is resilient being able to flex away from the front 46 to allow fiber optic cables to be inserted in or removed from the retainer 44. The retainer clip 54 returns to its position against the front 46 to ensure that the fiber optic cables 38 are retained within the retainer 44. In FIG. 5B, the top two retainers 44 are shown with the front 46 extending from the top 50 and the bottom two retainers 44 are shown with the front 46 extending from the bottom 52. Attachment slots 56 in an attachment bracket 58 at the arm 14 first end 18 accept screws or other fasteners for removably attaching the cable routing guide 10 to the structure 12. Alternatively or additionally, the attachment slots 56 may be holes extending through the attachment bracket 58 at the arm 14 first end 18. The cable routing guides 10 shown in FIGS. 5A and 5B are shown as they would attach to the right side of the structure 12. The same cable routing guides 10 may be attached to the left side of the structure 12, in which case the views of the cable routing guides 10 as shown in FIGS. 5A and 5B would be inverted.

Figure 6A:
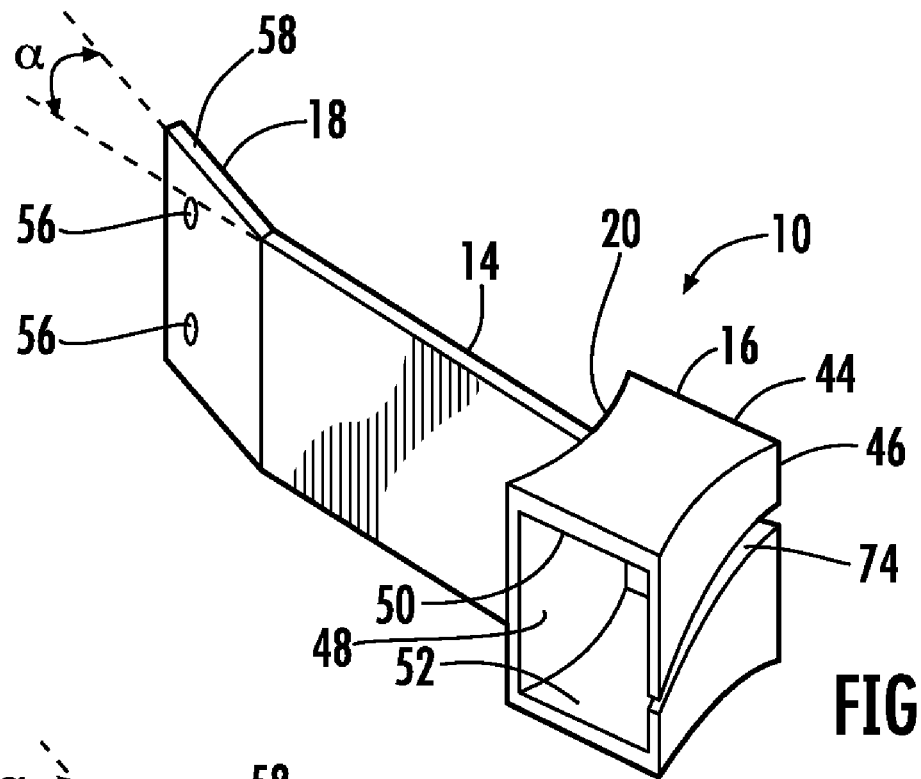
FIGS. 6A and 6B are perspective views of cable routing guides, according to exemplary embodiments.
Figure 6B:
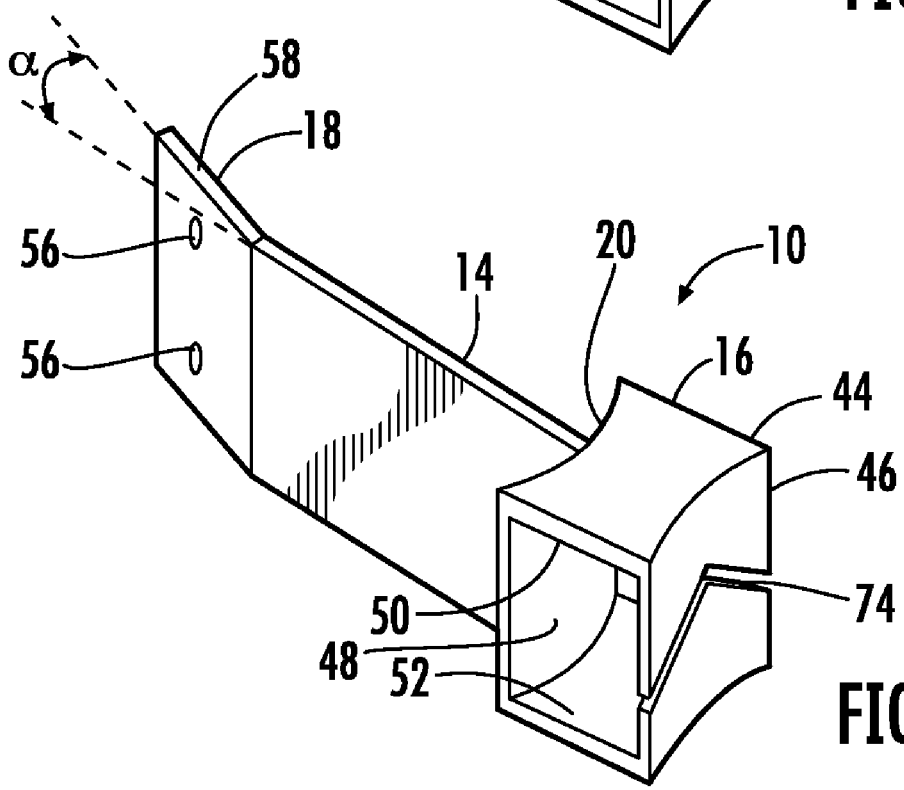

FIGS. 6B and 6B illustrate other embodiments of the cable routing guide 10. In FIGS. 6A and 6B the cable routing guide 10 has a retainer 44 having a front 46 with a retainer slot 74 instead of a retainer clip 54, as was illustrated in FIGS. 5A and 5B. The retainer slot 74 allows the fiber optic cable 38 to be intentionally inserted and removed from the retainer 44. However, the retainer slot 74 is formed in the retainer 44 in such a manner as to prevent the unintentional removal of the fiber optic cable 38 from the retainer 44. In FIG. 6A, the retainer slot 74 is cut in the face 46 at an angle from the top 50 to the bottom 52. In FIG. 6B, the retainer slot 74 is shown as an inverted v-shape. Although the v-shaped slot is shown inverted it may also be upright. Additionally, any shape of the retainer slot 74, including without limitation, straight, curved, curvilinear, or chevron may be used. Additionally in FIGS. 6A and 6B, the back 48 and the front 46 are concaved, bowing inwardly. The bowing of the back 48 and the front 46, provides for curved surfaces on which the fiber optic cable may contact. The curved surfaces facilitate the receiving and maintaining of the fiber optic cable 38 in and through the cable routing guide 10 and protecting against damage to the fiber optic cable 38. Although not shown in FIGS. 6A and 6B, the top 50 and the bottom 52 may also be concaved and/or bowed in a similar fashion.

Further, any mechanism, form or device may be used to allow the fiber optic cable 38 to be inserted in and intentionally removed from the cable routing guide 10 while preventing unintentional removal. An attachment bracket at the arm 14 first end 18 may be used to attach the cable routing guide 10 to the structure 12. The attachment bracket 58 may be connected at an angle "a" to the longitudinal axis of the arm 14. The angle "a" may be between about 0 degrees and 90 degrees. Attachment holes 56 may be used to attach the cable routing guide 10 to the structure 12, for example by screwing the cable routing guide 10 to the structure 12.

Figure 7A:
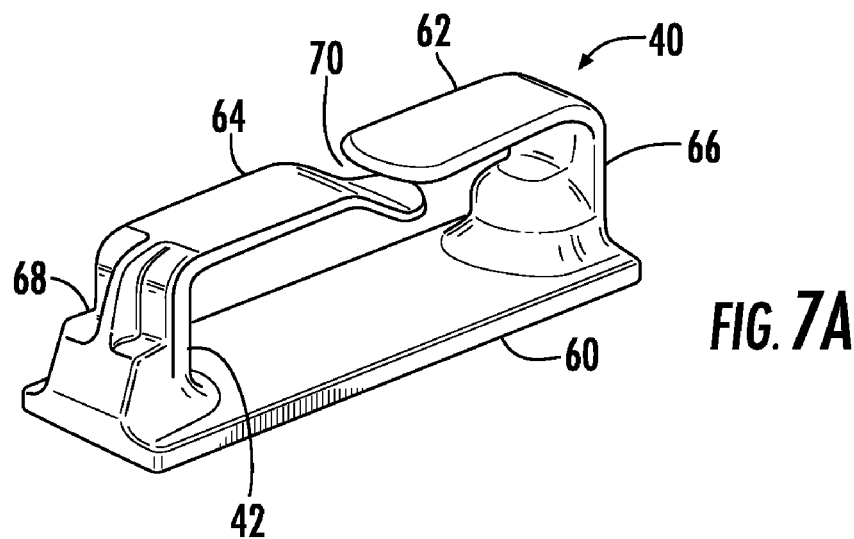
FIGS. 7A, 7B and 7C are views illustrating an exemplary embodiment of a jumper guide, according to an embodiment.
Figure 7B:
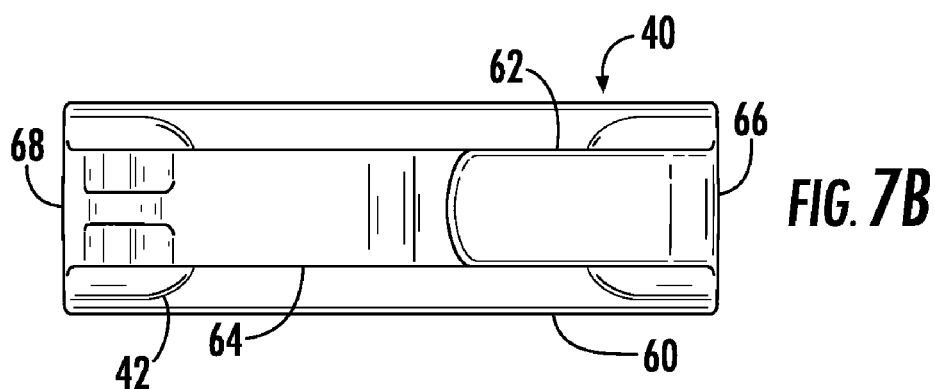
Figure 7C:
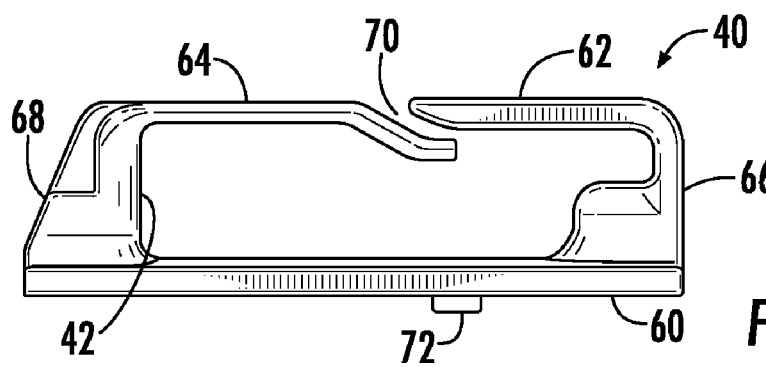

FIGS. 7A, 7B and 7C illustrate an embodiment of the jumper guide 40. In FIG. 7A is a top perspective view of the jumper guide 40; FIG. 7B is a top plan view; and FIG. 7C is a right side elevation view. The jumper guide 40 includes a base 60 a top 62, and a jumper clip 64. The base 60 connects to the top 62 at a first side 66 and to the jumper clip 64 at a second side 68. The guide post 42 extends from the base 60 at the second side 68. The jumper clip 64 is resilient and extends partially under the top 62 to form a jumper slot 70 located between the second side 68 and the post 42 for inserting fiber optic cables 38 into and removing fiber optic cables 38 from the jumper guide 40. The jumper slot 70 is formed in the jumper guide 40 to prevent the unintentional removal of the fiber optic cable 38 from the jumper guide 40. As mentioned above, the guide post 42 is used to align and organize the fiber optic cables 38 when the module is retracted or extended or moves therebetween. Attachment tab 72 may be used to removably attach the jumper guide 40 to the fiber optic equipment tray 26, for example by inserting the attachment tab 72 into a mounting hole (not shown) in the fiber optic equipment tray 26.

Many modifications and other embodiments of the invention set forth herein will come to mind to one skilled in the art to which the invention pertains having the benefit of the teachings presented in the foregoing descriptions and the associated drawings.

Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

What is claimed is:

1. A cable routing guide, comprising:
   an arm adapted to be attached to a structure, wherein the structure includes at least one cable connection point movable with respect to the structure between a first and second position; and
   a guide piece attached to the arm, wherein the guide piece is adapted to receive a length of at least one cable intended to be connected to the at least one cable connection point, and wherein the guide piece is oriented to the structure such that the guide piece allows the at least one cable to move in response to the cable connection point moving between the first position and the second position in a manner that the length of the at least one cable from the guide piece to the cable connection point remains substantially unchanged.

2. The cable routing guide of claim 1, wherein the guide piece is displaced from the longitudinal axis of the cable connection point a certain distance.

3. The cable routing guide of claim 1, wherein the guide piece is displaced from a transverse axis of the cable connection point a certain distance.

4. The cable routing guide of claim 1, wherein the guide piece is angularly displaced from a longitudinal axis of the cable connection point.

5. The cable routing guide of claim 4, wherein the guide piece is angularly displaced from a longitudinal axis of the cable connection point between 0 and 90 degrees.

6. The cable routing guide of claim 1, wherein the guide piece is located between the first and second positions of the cable connection point.

7. The cable routing guide of claim 1, wherein the cable is a fiber optic cable having at least one optical fiber with a connector attached thereto.

8. The cable routing guide of claim 7, wherein the cable connection point comprises a fiber optic adapter configured to receive the connector.

9. The cable routing guide of claim 1, wherein the cable connection point comprises a fiber optic module with a fiber optic adapter disposed on the fiber optic module, and wherein the fiber optic module moves between the first position and the second position.

10. A fiber optic apparatus, comprising:
    a fiber optic equipment tray;
    at least one module movably engaged with the fiber optic equipment tray, wherein the module moves between a first and a second position;
    at least one adapter disposed on the module, the adapter configured to receive a connectorized end of a fiber optic cable;
    a cable routing guide, wherein the cable routing guide is adapted to receive a length of the fiber optic cable intended to be connected to the at least one adapter, and wherein the cable routing guide allows the fiber optic cable to move in response to the module moving between the first position and the second position in a manner that the length of the fiber optic cable between the cable routing guide and the module remains substantially unchanged.

11. The fiber optic apparatus of claim 10, wherein the cable routing guide is displaced from a longitudinal axis of the at least one adapter a certain distance.

12. The fiber optic apparatus of claim 10, wherein the cable routing guide is displaced from a transverse axis of the at least one adapter a certain distance.

13. The fiber optic apparatus of claim 10, wherein the cable routing guide is angularly displaced from a longitudinal axis of the at least one adapter.

14. The fiber optic apparatus of claim 10, further comprising a jumper guide attached positioned between the cable routing guide and the at least one adapter, and wherein the jumper guide receives a portion of the length of the fiber optic cable from the cable routing guide.

15. The fiber optic apparatus of claim 14, wherein the jumper guide is adapted to align the portion of the length of the fiber optic cable with the at least one adapter.

16. The fiber optic apparatus of claim 15, wherein the cable routing guide is located between the first and second positions of the module.

17. A fiber optic apparatus, comprising:
a moveable fiber optic equipment tray positioned on a structure;
a fiber optic module positioned on the fiber optic equipment tray, wherein the fiber optic module has a fiber optic adapter disposed therein, and wherein the fiber optic adapter is moveable with respect to the structure between a first position and a second position; and
a cable routing guide comprising an arm and a guide piece, wherein the arm attaches the cable routing guide to the structure, and wherein the guide piece is adapted to receive a length of at least one fiber optic cable intended to be connected to the fiber optic adapter; wherein the guide piece is oriented to the structure such that the guide piece allows the at least one fiber optic cable to move in response to the fiber optic adapter moving between the first and second position such that the at least one fiber optic cable is retained and maintained by the cable routing guide without being substantially tensed or stressed, and wherein the length of the at least one fiber optic cable from the guide piece to the adapter remains substantially unchanged as the fiber optic adapter moves from the first position to the second position.

18. The fiber optic apparatus of claim 17, wherein the at least one fiber optic cable received by the cable routing guide is routed through the fiber optic apparatus to the cable routing guide, and wherein the at least one fiber optic cable is not substantially affected by the movement of the fiber optic equipment tray, the module, and/or the adapter between the first and second positions as the at least one fiber optic cable is routed to the cable routing guide.

* * * * *